No. 690,175. Patented Dec. 31, 1901.
G. W. McKENZIE.
CLAMP.
(Application filed Apr. 29, 1901.)
(No Model.) 2 Sheets—Sheet 1.

WITNESSES:
A. D. Harrison
P. W. Pezzetti

INVENTOR:
G. W. McKenzie
by Knight Brown & Quinby
attys.

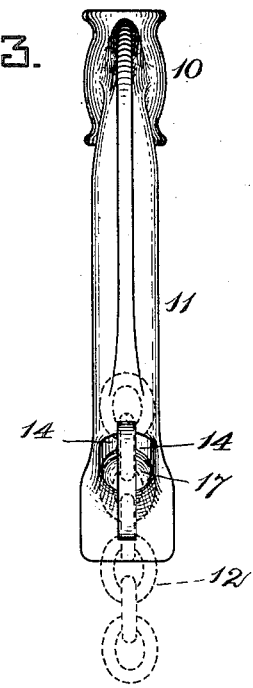
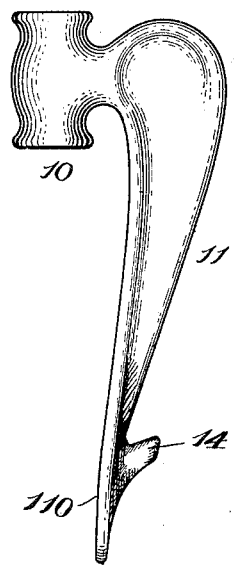
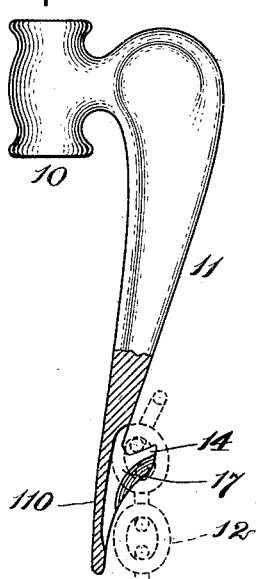
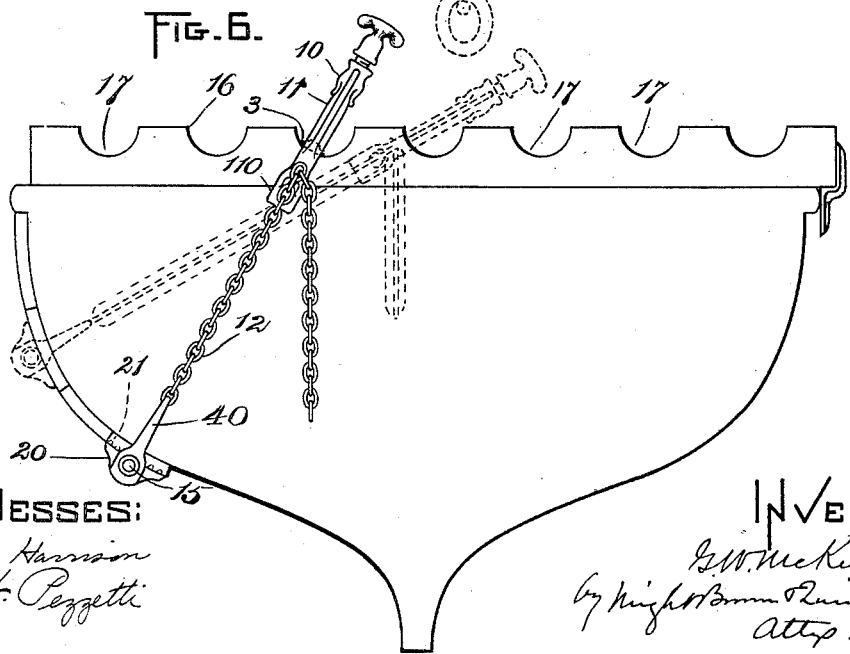

UNITED STATES PATENT OFFICE.

GEORGE W. McKENZIE, OF WILMINGTON, MASSACHUSETTS.

CLAMP.

SPECIFICATION forming part of Letters Patent No. 690,175, dated December 31, 1901.

Application filed April 29, 1901. Serial No. 57,930. (No model.)

*To all whom it may concern:*

Be it known that I, GEORGE W. MCKENZIE, of Wilmington, in the county of Middlesex and State of Massachusetts, have invented certain new and useful Improvements in Clamps, of which the following is a specification.

This invention has for its chief object to provide a clamp adapted to bring to and hold in place boards or planks which when in their final position are curved or present irregular surfaces, the invention being intended particularly for use of boat-builders in bringing to place the external planks of the hull and holding the same while they are being permanently secured.

The invention consists as a whole in a clamp comprising two members having opposed clamping-faces, one of said members having a connection-engaging offset-arm formed to bear on the outer surface of a section of planking, while the other member has a screw-threaded stem, a nut engaged with the stem and having a connection-engaging offset-arm also formed to bear on said outer surface, and a flexible member, such as a chain, connecting said arm with the other clamp member, said flexible member causing the clamping action of the two members when the screw-stem is rotated and being at the same time caused by the contact of said arms with the outer surface of the planking to conform closely to said surface between the two members, the chain being preferably detachably engaged with the two arms and made of such length that the said members may be placed at any desired distance apart, so that any desired number of planks may be interposed between them, a single clamp being thus adapted for use in securing all the planks of a boat, as will hereinafter more fully appear.

Figure 1:
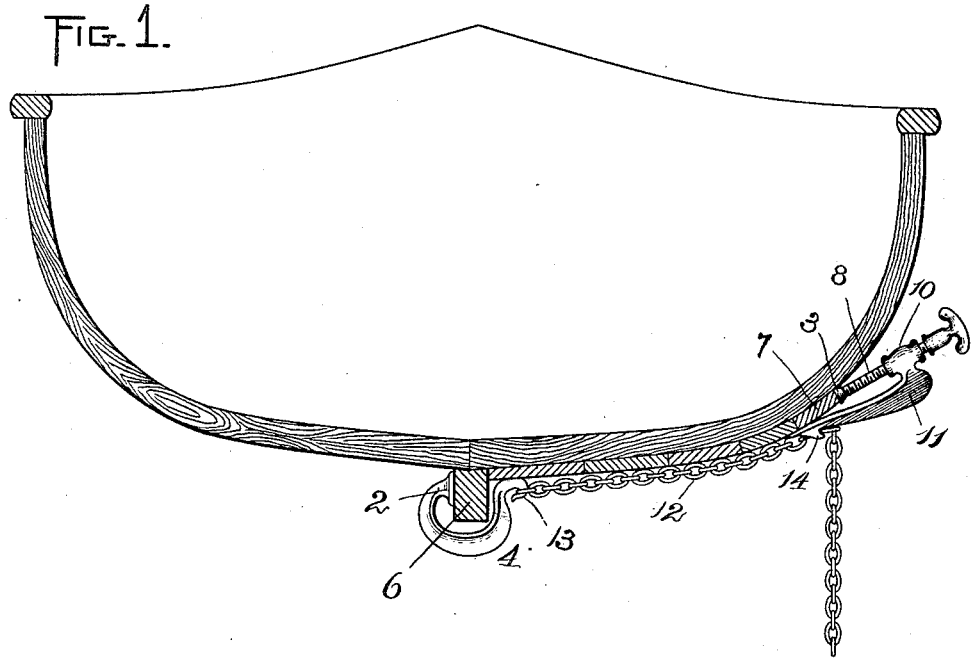
Figure 2:
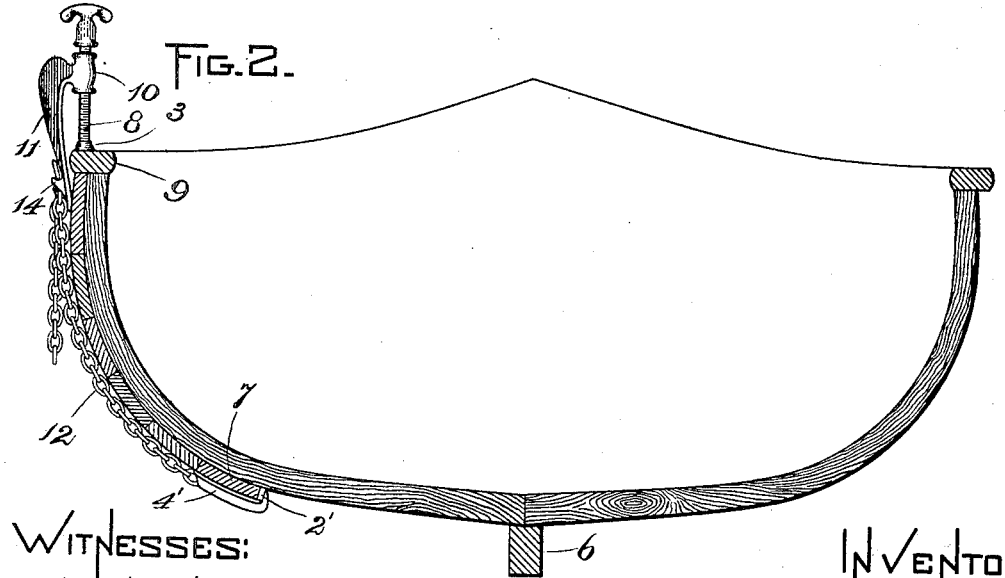

Of the accompanying drawings, forming a part of this specification, Figures 1 and 2 represent partial midship-sections of a partially-completed boat, showing two forms of my improved clamp in operation thereon. Figs. 3 and 4 represent side views of the nut and its arm. Fig. 5 represents a section on line 5 5 of Fig. 3. Fig. 6 represents an elevation of a portion of the stern of a boat, showing another form of clamp embodying my invention.

The same reference characters indicate the same parts in all the figures.

In the drawings, 2 and 3 represent the two members of my improved clamp, the said members having opposed clamping-faces. The member 2 has an arm 4 formed on or rigidly attached to it, the form of said arm depending on the location in which it is to be used. The arm 4 on the clamp member 2 (shown in Fig. 1) is curved to pass under and partially around the keel 6 of a boat, the member 2 bearing on one side of said keel, while the arm 4' on the clamp member 2' (shown in Fig. 2) is formed to bear on or lie in close proximity to the outer side of an unattached plank 7, the outer edge of which is engaged by the member 2'. In either case the arm is offset from the clamping-face, so that the inner side of the arm is formed and adapted to bear on the outer surface of a section of planking between the two clamping-faces. The clamp member 3 is engaged with one end of a screw-threaded shank or stem 8, the connection between the member 3 and stem 8 being such that the stem can be freely rotated, while the member 3 bears without rotating on the edge of an unattached plank 7, as shown in Fig. 1, or against the gunwale 9, as shown in Fig. 2.

10 represents a nut which is engaged with the screw-stud 8 and is provided with an offset-arm 11, which extends in a direction substantially parallel with the screw-stud. The outer end of the arm 11 is widened and has a flat face 110 at its inner side, said face being so formed and arranged that when in use, as shown in Figs. 1 and 2, it bears against the outer side of a plank or other surface adjacent to the member 3 and prevents the nut and arm from turning with the screw.

12 represents a flexible member which connects the arms 4 or 4' and 11 and is adapted to transmit power from one clamp member to the other when the screw is rotated, the flexibility of said member 10 and the contact of the arms 4 or 4' and 11 with the outer surface of the section of planking causing the said connecting member to conform to the surface of said section intervening between the two members, as shown in Figs. 1 and 2, so that the pressure of the member engaged with the plank 7 does not tend to pull said plank away from the beam or support to which it is to be attached.

The member 12 is preferably a chain and is preferably detachably connected with the arms 4 or 4' and 11, so that it may be made of any desired length and permit any desired separation of said arms, thus adapting the clamp members to a wide variation in the width of the structure or material interposed between them. The arms 4 or 4' and 11 may be provided with any suitable devices for detachably engaging the chain. As here shown, the arm 4 or 4' is provided with a hook 13, adapted to enter a link of the chain, while the arm 11 is provided with two shoulders 14 14, between the inner sides of which is a cavity or socket 17, adapted to receive a chain-link placed between said shoulders, the next link above bearing upon the shoulders and being supported thereby.

In Fig. 6 I show as a substitute for the clamp member 2 or 2' and its arm 4 or 4' a clamp member 20 and an arm 40, pivoted at 15 to the clamp member, so that the latter can tip to adjust itself to the varying curves and angles of the ends of planks projecting from the stern of a boat. In this case a rest or bearing 16 is provided for the member 3, said bearing being a plank or board having a series of semicircular recesses 17, adapted to support the member 3 in a variety of positions, as indicated in full and dotted lines in Fig. 6. The clamping-face of the member 20 may be provided with spurs 21 to slightly enter the plank on which this member bears and prevent the member 20 from slipping.

My invention is not limited to use on curved work like that here illustrated, and it may be used for clamping floor-boards and for various other kinds of work. The form of the arms 4 or 4' and 11 may be varied from the forms here shown in accordance with the requirements of the work.

I claim—

1. A clamp comprising two members having opposed clamping-faces, one of said members having an offset-arm and the other a screw-threaded stem, a nut engaged with said stem and having also an offset-arm, and a flexible connection between the said arms, the said arms being formed to bear on the outer surface of a section of planking, whereby the said flexible connection is caused to conform to said surface.

2. A clamp comprising two members having opposed clamping-faces, one of said members having an offset-arm formed to bear on the outer surface of a section of planking, said arm being provided with a chain-engaging device, while the other member has a screw-threaded stem, a nut engaged with said stem and having also an offset-arm formed to bear on said outer surface, said arm being provided with a chain-engaging device and a chain adjustably engaged with the said offset-arms and adapted to be held thereby against the outer surface of the section of planking.

3. A clamp comprising two members having opposed clamping-faces, one of said members having an arm and the other a screw-threaded stem, a nut engaged with said stem and having an arm which is flattened at one side to bear on the work being clamped and prevent rotation or turning of the nut, and a flexible connection between said arms.

In testimony whereof I have affixed my signature in presence of two witnesses.

GEORGE W. McKENZIE.

Witnesses:
C. F. BROWN,
A. D. HARRISON.